United States Patent [19]

Young

[11] 3,963,472

[45] June 15, 1976

[54] PROCESS FOR PREVENTING CORROSION BY INCORPORATIVE SOLUBLE METAL CHROMATES IN FERTILIZER SOLUTIONS

[75] Inventor: Donald C. Young, Fullerton, Calif.

[73] Assignee: Union Oil Company of California, Brea, Calif.

[22] Filed: June 27, 1969

[21] Appl. No.: 837,295

[52] U.S. Cl............................... 71/33; 71/36; 71/48; 71/51; 106/14; 148/6.16; 252/393; 423/313
[51] Int. Cl.$^2$.................. C05B 7/00; C01B 15/16; C01B 25/26; C23C 1/10
[58] Field of Search.................. 148/6.16; 252/393; 71/36, 51, 33, 48; 106/14; 423/313

[56] References Cited
UNITED STATES PATENTS

| | | | |
|---|---|---|---|
| 2,819,193 | 1/1958 | Rausch ............................. | 148/6.16 |
| 2,832,708 | 4/1958 | Karchner ........................... | 148/6.16 |
| 2,835,618 | 5/1958 | Keller et al. ....................... | 148/6.16 |
| 2,900,222 | 8/1959 | Kahler et al. ..................... | 148/6.16 UX |

Primary Examiner—Joseph L. Schofer
Assistant Examiner—H. J. Lilling
Attorney, Agent, or Firm—Richard C. Hartman; Dean Sandford; Michael H. Laird

[57] ABSTRACT

A soluble chromate or dichromate is incorporated in a system comprising a metal and an orthophosphate-containing liquid to inhibit corrosion of the system under highly turbulent conditions. The system in which the chromate or dichromate is incorporated is a system in which the metal surface is normally passivated against corrosion by an orthophosphate-containing film; however under the erosive conditions experienced by the system, the phosphate film is destroyed. The incorporation of the chromate or dichromate in the system prevents corrosion under such conditions. In a typical system, a chromate or dichromate is incorporated in an ammonium phosphate solution which is exposed to contact with a ferrous metal.

1 Claim, No Drawings

PROCESS FOR PREVENTING CORROSION BY INCORPORATIVE SOLUBLE METAL CHROMATES IN FERTILIZER SOLUTIONS

DESCRIPTION OF THE INVENTION

The invention relates to the prevention of abnormal corrosion in normally passive systems comprising a metal and an orthophosphate-containing liquid and, particularly, to prevention of corrosion in such systems which are normally protected by a metal phosphate film, but which are exposed to erosive conditions that induce corrosion by destruction of the phosphate film.

Orthophosphate-containing liquids are normally not considered corrosive to most of the transition metals and their alloys because these metals form insoluble orthophosphates at pH values above about 4.0. Exposure of a clean metal surface to orthophosphate-containing liquids at such pH values, i.e., at neutral to alkaline conditions, results in the formation of the insoluble metal orthophosphate as a film on the surface of the metal and thereby passivates the metal by protecting the body of the metal from further corrosive attack. While the orthophosphate film protects or passivates the metal against corrosion under normal or quiescent conditions, I have found that when the metals are exposed to a highly turbulent flow, the orthophosphate film is eroded from the metal surface and the exposed metal surface is thereby free to corrode. The high degree of agitation required for such erosion can occur at various points in equipment used for the handling, storage and preparation of various phosphate solutions, e.g., at sharp bends, elbows, orifices, tubing entrances, etc.

I have further found that the incorporation of a soluble chromate or dichromate in the orthophosphate-containing solution in minor amounts is effective in imparting to the protective film on the metal surface a sufficient degree of hardness or resistance to erosion so that even under the highly turbulent flow conditions the metal remains passivated. Accordingly, my invention comprises the incorporation of an effective amount of a soluble chromate in an orthophosphate-containing solution so as to inhibit said system against corrosion under highly turbulent flow conditions.

Systems which are normally passivated against corrosion by an orthophosphate film are the subject of this invention. These systems comprise a metal surface and an aqueous orthophosphate-containing liquid at near neutral to alkaline conditions, e.g., pH of from about 4 to about 13. These include the ammonium and alkali metal orthophosphate solutions. These solutions or acids can be derived from pure phosphoric acid or can contain impurities as hereafter described. Examples of suitable aqueous solutions include solutions of ammonia and alkali metal orthophosphates, ammonium and diammonium orthophosphate, sodium, disodium and trisodium orthophosphate, lithium, dilithium and trilithium orthophosphate, potassium, dipotassium and tripotassium orthophosphate, etc.

The phosphate solutions can be derived from pure phosphoric acid and be relatively free of metal impurities or the phosphates can be derived from wet-process phosphoric acid containing from about 1 to about 10 weight percent metallic impurities comprising iron, aluminum, magnesium, zinc, copper, calcium, vanadium as well as sulfate, fluoride and silica. The metallic impurities are maintained in solution by the presence of from 5 to 60 weight percent of the phosphorus in the form of acyclic polyphosphates, e.g., pyrophosphates, tripolyphosphates, tetrapolyphosphates, etc. The remainder of the phosphorus in such solutions, from 40 to 95 percent, is in the orthophosphate form.

The concentrations of the solutes in the aqueous solutions can be from about 5 to about 60 weight percent, i.e., to their limit of solubility. Mixtures of the salts can also be employed, typical of which is the fertilizer grade "8-24-0" which comprises 8 percent nitrogen and 24 percent phosphorus as $P_2O_5$ and comprises a mixture of monoammonium and diammonium orthophosphate having an empirical formula of:

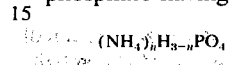

$(NH_4)_nH_{3-n}PO_4$ wherein:

$n$ is from 1.3 to 1.7.

All of the aforementioned solutions, under quiescent or non-turbulent flow conditions, are substantially non-corrosive to the transition metals and their alloys. Under these conditions, it is known that the metal forms an insoluble orthophosphate film on the surface of the metal exposed to the aqueous orthophosphate containing solution and that this film passivates the metal against further corrosion.

Examples of various metals which can be used in their pure state or alloyed with any of the other metals include the following: copper, silver, gold, beryllium, magnesium, zinc, cadmium, aluminum, indium, thallium, tin, lead, titanium, zirconium, antimony, bismuth, vanadium, niobium, tantalum, chromium, molybdenum, tungsten, manganese, rhenium, iron, cobalt, nickel, ruthenium, rhodium, palladium, osmium, iridium, platinum, etc.

Of the aforementioned metals, the most significant in order of decreasing use when exposed to liquid solutions containing phosphates are the following: iron, aluminum, copper and nickel, alone as base metals, or as commonly alloyed with minor amounts, e.g., from 0.01 to 45 weight percent, generally from 0.1 to 20 weight percent, with each other or any one or more of the following: carbon, e.g., mild steel, zinc, e.g., brass; tin, e.g., bronze or admiralty metal; tungsten; chromium, e.g., stainless steel, nimonic metals; molybdenum, e.g., Hasalloys A–C; vanadium; manganese; silicon, e.g., Hasalloy D; magnesium; or titanium. Of the aforementioned, ferrous metals and particularly the carbon containing ferrous alloys such as mild steel are the most commonly encountered metal.

The chromate or dichromate which can be incorporated in the phosphate containing liquid include the soluble chromates and dichromates such as the ammonium, alkali metal and alkaline earth metal, chromates and dichromates. Examples of such are ammonium chromate, ammonium dichromate, sodium chromate, potassium dichromate, lithium chromate, cesium dichromate, calcium chromate, barium dichromate, magnesium chromate, strontium dichromate, beryllium chromate, etc. The chromates or dichromates should be incorporated in the aqueous liquid in a quantity effective to provide a concentration expressed as chromium of from about 0.5 to about 0.001; preferably from about 0.1 to about 0.01 weight percent. Any of the aforementioned soluble chromates or dichromates can be added in this quantity to the aqueous solution to inhibit the erosion induced corrosion of the metal surface. Such erosion can occur with fluid linear velocities through tubular elements greater than about 3 feet per second, e.g., from 3 to about 10 feet per second.

It is not known with certainty the mechanism by which the chromate inhibits the erosion induced corrosion of the metal surfaces. It is possible that the chromate becomes incorporated in the phosphate film and renders it more resistant to erosion or it is possible that the chromate forms an entirely independent chromate film which protects the metal against corrosion. Regardless of mechanism, however, I have found that the addition of the aforementioned quantities of chromate or dichromate prevents corrosion which can occur when a metal surface is exposed to erosive conditions by a phosphate-containing liquid.

The following examples will illustrate the mode of practice of the invention and demonstrate the results obtainable thereby.

EXAMPLE 1

The ammonium phosphate solution used in this experiment comprised a mixture of mono- and diammonium orthophosphates which was prepared from concentrated wet-process phosphoric acid. The sample had a pH of 6.7, a nitrogen content of 10 and a phosphate content of 31 weight percent expressed as $P_2O_5$. The solution contained approximately 50 percent of its phosphorus in the form of acyclic polyphosphates and contained sulfate and aluminum, iron and magnesium impurities which were retained in soluble form by the polyphosphates.

The relative corrosivity of the solution to mild steel was determined in the laboratory under static and highly agitated conditions at 75° and at 150°F. The laboratory test equipment comprised a Corrator which had mild steel electrodes which were immersed in the solution. The electrodes were conditioned by immersion in the uninhibited ammonium phosphate solution over night prior to use in the test. The corrosion rates were determined under static and highly agitated conditions with a nitrogen gas blanket to avoid effects of air. The observations were made on the uninhibited ammonium phosphate solution until a relatively constant corrosion rate was observed and then a potassium dichromate inhibitor was added and the corrosion rates were continued to be observed to obtain an indication of the final corrosion rate.

The corrosion inhibitor used in the experiment was potassium dichromate that was added at 120, 240, 350 and 700 parts per million. The following results were obtained:

Table

| Test No. | Velocity | Temperature °F. | Concentration $K_2Cr_2O_7$, ppm | | | | |
|---|---|---|---|---|---|---|---|
| | | | 0 | 120 | 240 | 350 | 700 |
| 1 | Static | 75 | 90 | | | 50 | |
| 2 | Static | 150 | 250 | | | | |
| 3 | Agitated | 75 | 170 | | | 50 | |
| 4 | Agitated | 150 | 350 | | | 190 | 150 |
| 5 | Agitated | 150 | 400 | 260 | 260 | 260 | — |

The results evidence that the solution was substantially non-corrosive under static conditions in the absence of any chromate but when the solutions were agitated the corrosion increased substantially. The addition of the chromate, however, restored the passivity of the system.

The preceding illustrated mode of practice can be employed with any of the aforementioned chromate or dichromate additives which can be added at equivalent concentrations to obtain the same results to the illustrated ammonium phosphate solution or to any of the aforementioned orthophosphate-containing liquid.

EXAMPLE 2

The following illustrates application of the invention to a commercial process. An ammonium phosphate solution of approximately 10-31-0 composition is produced by the continuous addition of aqua ammonia (20-0-0) and concentrated wet-process phosphoric acid (0-70-0). The neutralization is performed in a reactor unit comprising a tank in which an inventory of the ammonium phosphate is maintained, a centrifugal pump which circulates the solution through a tubular cooler and returns it to the tank. The circulation rate through the cooler is controlled to maintain the temperature at about 150°F. The cooler comprises several banks of mild steel, ¾ diameter, horizontal tubes with return headers which have their outside surfaces wetted by water sprays. The solution velocity through the tubes is about 5 feet per second. The ammonium phosphate solution is circulated through the tubes and finished product is continuously withdrawn from the unit.

It is noted that rapid corrosion is experienced in the tubular cooler at two locations; at points located several pipe diameters downstream from the inlet end of the tubes and at points several pipe diameters downstream from joints where shorter tubes have been butt welded together. The location of these areas of high corrosion correspond to the expected areas of highly turbulent flow which accompany fluid entrance into a tube and flow through orifices in a tube.

After repair of the cooler, the unit is again placed in production of ammonium phosphate; however, potassium chromate is continuously added to maintain a concentration of about 200 parts per million in the ammonium phosphate solution. No corrosion is thereafter experienced in the unit.

I claim:

1. In the method wherein an aqueous fertilizer solution having a solute concentration from 5 to 60 weight percent and a pH of 4 to about 13 and containing about 10 percent ammonium, expressed as nitrogen and 31 weight percent phosphate, expressed as $P_2O_5$, with about 50 percent of said phosphate as acyclic polyphosphate and the balance as orthophosphate is prepared, stored and handled and, in such method, contacts a metal which, under quiescent conditions, is passivated against corrosion from said solution by an orthophosphate-containing film, the improved method for preventing corrosion when said contact is under turbulent conditions which erode said film and thereby destroy said passivity that comprises incorporating an inhibitor consisting essentially of a soluble ammonium, alkali metal or alkaline earth metal chromate or dichromate in said solution in an effective amount to inhibit said corrosion.

2. The method of claim 1 wherein said metal is a ferrous metal.

3. The method of claim 1 wherein said metal is steel.

4. The method of claim 1 wherein an alkali metal chromate is incorporated in said solution.

5. The method of claim 1 wherein ammonium chromate or dichromate is incorporated in said solution.

6. The method of claim 1 wherein said solution contains sulfate, aluminum, iron and magnesium impurities.

* * * * *